W. E. BEILMAN.
WATER HEATER.
APPLICATION FILED JULY 30, 1909.
963,415.
Patented July 5, 1910.
2 SHEETS—SHEET 2.
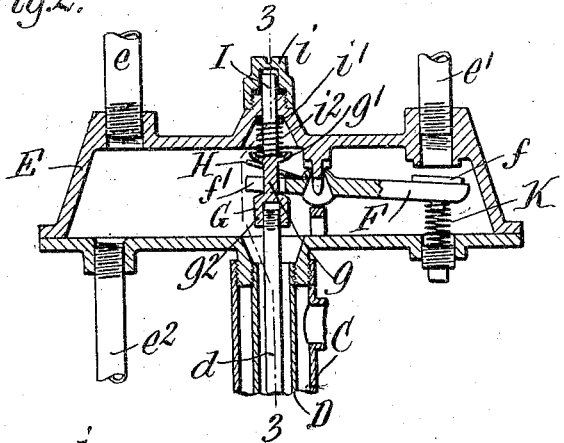
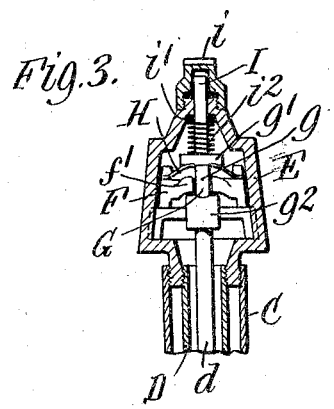
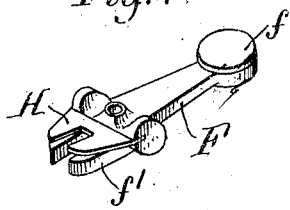
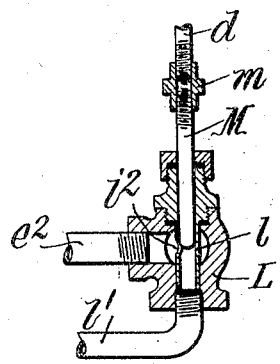
Witnesses.
E. A. Volk.
A. G. Dimond
Inventor:
William E. Beilman,
by Wilhelm, Parker & Hand,
Attorneys

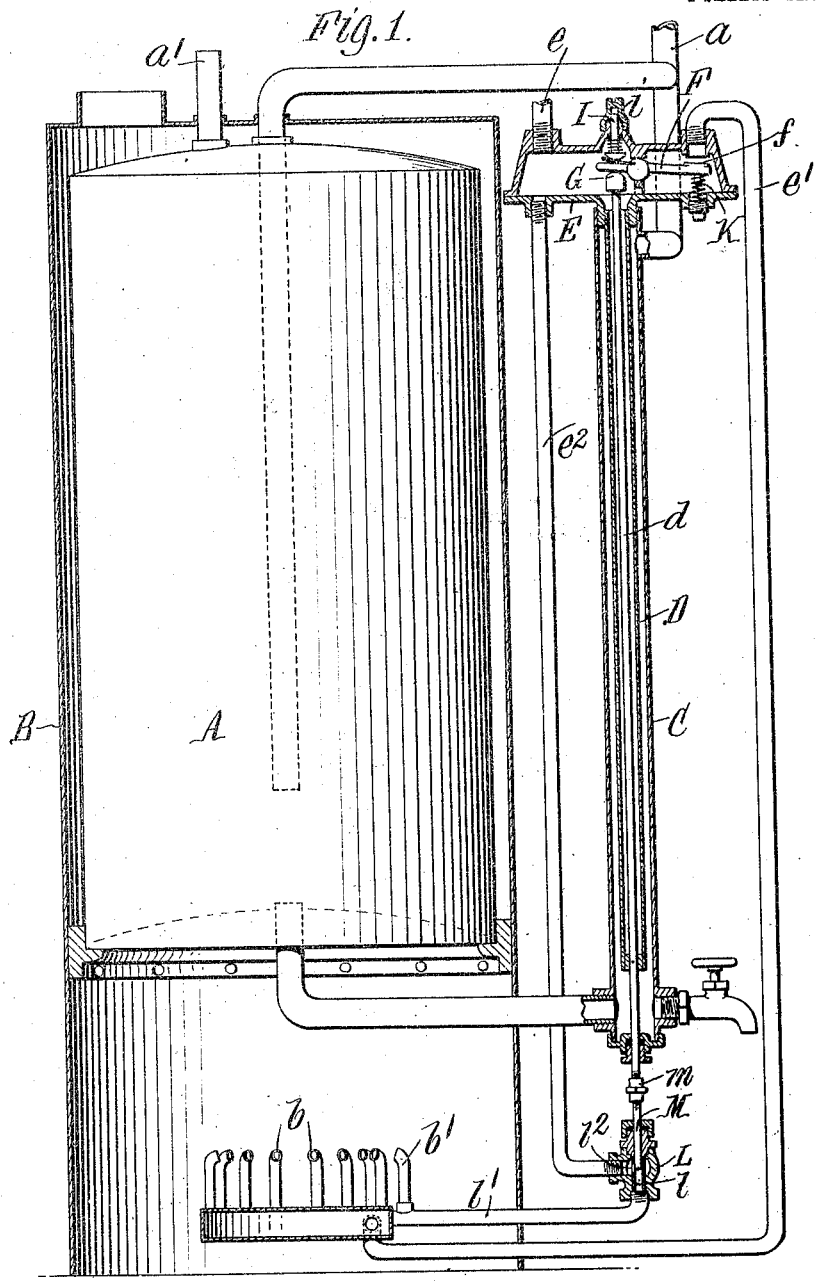

UNITED STATES PATENT OFFICE.

WILLIAM E. BEILMAN, OF BUFFALO, NEW YORK.

WATER-HEATER.

963,415.

Specification of Letters Patent.

Patented July 5, 1910.

Application filed July 30, 1909. Serial No. 510,422.

*To all whom it may concern:*

Be it known that I, WILLIAM E. BEILMAN, a citizen of the United States, residing at Buffalo, in the county of Erie and State of New York, have invented a new and useful Improvement in Water-Heaters, of which the following is a specification.

This invention relates to improvements in water heaters of that type in which an automatic regulator operated by a thermostat is employed for regulating the supply of the heating agent in accordance with the temperature of the water.

The object of this invention is to construct a water heater of this type having main and secondary burners, in which simple and positively operated means are employed for controlling the supply of the heating agent to both burners and for maintaining at all times a limited supply of the heating agent in the secondary burner and regulating such limited supply in accordance with the temperature of the water.

In the accompanying drawings: Figure 1 represents a sectional elevation of a water heater embodying the invention. Fig. 2 is a fragmentary sectional elevation, on an enlarged scale, of the valve casing and regulating valve for the main burners. Fig. 3 is a transverse sectional elevation, on line 3—3, Fig. 2. Fig. 4 is a perspective view of the main regulating valve detached. Fig. 5 is a fragmentary sectional elevation, on an enlarged scale, of the regulating valve for the pilot burner, and its associated parts.

Like reference characters refer to like parts in the several figures.

A represents a water reservoir or boiler which is of the usual construction, having suitable inlet and outlet pipes $a$ and $a'$; and surrounded by a casing B in the lower portion of which, beneath the reservoir, are located the main gas burners $b$ and the pilot or secondary burner $b'$. A thermostat pipe C is conveniently arranged outside of the casing in communication with the reservoir so that the water of the reservoir is free to circulate through this pipe. A suitable thermostat tube D is suspended in the pipe C and is provided with a valve operating rod $d$ which extends through the tube and is rigidly secured in the lower end thereof so that it is moved by the expansion and contraction of the tube. At the upper end of the pipe C and the tube D, is located a valve casing E provided with a gas inlet pipe $e$ and outlet or feed pipes $e'$ and $e^2$ for supplying gas to the main and pilot burners respectively.

All of the parts so far described are common in heaters of this general type and may be of any suitable construction.

This invention relates particularly to the construction and regulation of the valves for controlling the supply of gas to the main and pilot burners.

It consists in constructing the valves for both the main and pilot burners and connecting them with the thermostat in such a manner that the supply of gas to both burners will be regulated by the temperature of the water and the pilot valve will admit a limited amount of gas to the pilot burner after the valve for the main burners has been closed, for maintaining the temperature of the water, and in case the temperature of the water increases after the valve for the main burners is closed, the pilot valve will be further closed by the thermostat until only sufficient gas is admitted to the pilot burner to keep the same lighted, thereby preventing the overheating of the water and the waste of gas incident thereto. In the construction shown, the following means are employed for accomplishing this:

A main valve F is pivotally secured between its ends within the casing E, being provided at one end with an annular valve face $f$ which is adapted to close the end of the feed pipe $e'$. The other end or arm $f'$ of this valve is slotted and straddles a reduced portion $g$ of a head G which is screwed upon the upper end of the valve operating rod $d$ and has enlarged portions $g'$ and $g^2$ above and below the slotted arm $f'$ of the valve which are of greater diameter than the slot in this arm and are spaced apart so that the rod $d$ and its head G can move a limited distance independently of the valve F. A slotted flat spring H is secured at one end to the arm $f'$ and at its other end engages the underside of the upper enlarged portion $g'$ of the head G. This spring holds the arm $f'$ normally in engagement with the lower enlarged portion $g^2$ of the head G and tends to prevent any up and down movement of the rod $d$ independent of the arm $f'$, thereby causing the movement of the rod to be communicated to the valve F. When the thermostat tube D expands under the action of the heated water, the rod $d$ is moved downwardly, thus serving to gradually raise the valve face $f$ until it closes the opening into the feed pipe $e'$ for the main burners, and when the water cools, the thermostat tube D contracts, moving the rod $d$ upwardly and opening the valve. The supply of gas to the main burners is thus regulated by the temperature of the water.

The head G has a reduced stem I which projects through an opening in the upper side of the casing E where it is accessible for turning to adjust the head on the rod $d$. A cap or cover $i$ is screwed upon a suitable boss on the casing E and incloses and protects the outer end of the stem I. A suitable packing $i'$ surrounds the stem I adjacent to the underside of the boss for preventing the escape of gas through the opening in the casing around the stem, and a coiled spring $i^2$ is arranged around the stem I between this packing and the upper enlarged portion $g'$ of the head G for holding the packing in position. A coiled spring K is preferably located between the underside of the valve face $f$ and the bottom of the casing and serves to supplement the action of the spring H and assist in closing the main valve.

For regulating the supply of gas to the pilot burner the following construction is employed: The gas feed pipe $e^2$ for the pilot burner connects with a valve casing L through which extends a sleeve $l$ which communicates at its lower end with a pipe $l'$ leading to the pilot burner. In the sleeve $l$ within the valve casing L is a port $l^2$ through which the gas passes from the feed pipe $e^2$. This port is controlled by a pilot valve M which fits within the sleeve $l$ and extends through the top of the valve casing L, where it is connected by an adjustable coupling $m$ with the lower end of the valve-operating rod $d$. The pilot valve M is moved back and forth past the port $l^2$ by the operating rod $d$ under the action of the thermostat, and regulates the size of this port in accordance with the temperature of the water. As the valve M for the pilot burner and the valve F for the main burners are both connected to and actuated by the same valve operating rod, these valves move in unison in accordance with the expansion and contraction of the thermostat. The pilot valve M is so adjusted upon the actuating rod $d$ that a movement of the latter, sufficient to close the valve F, will not move the valve M a sufficient distance to entirely close the port $l^2$ and a limited amount of gas will be supplied to the pilot burner after the supply to the main burners has been entirely shut off. The pilot burner will thus tend to maintain a uniform temperature of the water in the reservoir after the same has been heated and will prevent the cooling thereof. It sometimes happens, however, that when no water is being used, the temperature of the water in the boiler will continue to increase under the action of the heat from the pilot burner after the main burners have been shut off. This produces a further expansion of the thermostat sufficient to overcome the resistance of the spring H and move the valve operating rod $d$ downward until the enlarged portion $g'$ of the head G encounters the arm $f'$ of the main valve F, when further movement is prevented. This additional movement of the rod $d$ after the valve F is closed moves the pilot valve M past the port $l^2$, thus further reducing the supply of gas to the pilot burner. The supply is not entirely cut off, however, as the pilot valve M is sufficiently loose in the sleeve $l$ to permit a small amount of gas to enter the port $l^2$ and pass through the sleeve to the pilot burner for maintaining the flame thereof. This results in a material saving of gas and at the same time serves to keep the water in the reservoir at the desired temperature and to prevent the overheating thereof and the waste of gas incident thereto. By adjusting the coupling $m$, the position of the valve M relative to the port $l^2$ may be regulated so that the valve will be moved a greater or less distance past this port under the action of the operating rod and the flame of the pilot burner can thus be regulated in accordance with the pressure of gas and the size of the heater.

By arranging the valves for the main and pilot burners at opposite ends of the thermostat, a simple and compact construction is produced in which both valves are positively and simultaneously operated by the thermostat. The expansion and contraction of the thermostat thus regulates the supply of gas to both burners in accordance with the temperature of the water. The pilot burner is utilized for heating purposes as well as for lighting the main burners, and its use does not result in the waste of gas which occurs in constructions in which the supply of gas to the pilot burner is not regulated. Greater efficiency is thus obtained from the burners and a more uniform temperature of the water is maintained in the reservoir with an economic consumption of gas.

I claim as my invention:

1. In a water heater, the combination of a reservoir, main and secondary heaters therefor, main and secondary devices for controlling the supply of the heating medium to said main and secondary heaters, and thermostatic means influenced by the temperature of the water for operating said main and secondary controlling devices to shut off the supply of the heating medium for the main heater and thereafter to regulate the supply of heating medium to the secondary heater while the supply of the heating medium to the main heater remains shut off, substantially as set forth.

2. In a water heater, the combination of a reservoir, main and secondary heaters therefor, main and secondary valves for controlling the supply of fuel to said main and secondary heaters respectively, and thermostatic means influenced by the temperature of the water which operate to close said main valve to shut off the supply of fuel to the main heater at a predetermined temperature of the water and thereafter operate the secondary valve to regulate the supply of fuel to the secondary heater while the main valve remains closed, substantially as set forth.

3. In a water heater, the combination of a reservoir, main and secondary heaters therefor, main and secondary valves for controlling the supply of fuel to said main and secondary heaters respectively, thermostatic means influenced by the temperature of the water for operating said valves, and a connection between the thermostatic means and the main valve which allows the secondary valve to be actuated by the thermostatic means when the main valve is closed, substantially as set forth.

4. In a water heater, the combination of a reservoir, main and secondary heaters therefor, main and secondary valves for controlling the supply of fuel to said main and secondary heaters respectively, a thermostat influenced by the temperature of the water, and a rod operated by said thermostat and connected with said valves, said rod having a yielding connection with the main valve which allows the secondary valve to be actuated by said rod after the main valve has been closed.

5. In a water heater, the combination of a reservoir, main and secondary heaters therefor, main and secondary valves for controlling the supply of fuel to said main and secondary heaters respectively, a water connection arranged between said valves, a rod extending through said water connection and operated thermostatically by the temperature of the water, said rod being connected at its opposite ends to said valves for operating them, substantially as set forth.

Witness my hand, this 28th day of July, 1909.

WILLIAM E. BEILMAN.

Witnesses:
E. C. HARD,
C. B. HORNBECK.